United States Patent [19]

Tailhades et al.

[11] Patent Number: 5,731,049
[45] Date of Patent: Mar. 24, 1998

[54] COMPOSITE MATERIAL FOR MAGNETOOPTIC RECORDING ITS PREPARATION AND ITS USE

[75] Inventors: Philippe Tailhades, Toulouse; Jean-Pierre Bonino, Pechabou; Isabelle Pasquet, Ramonville; Lionel Presmanes, Tarbes; Laurence Bouet, Toulouse; Abel Rousset, Ramonville St Agne; Patrick Langlade, Plaisance du Touch, all of France

[73] Assignee: ATG-Cygnet, Toulouse Cedex, France

[21] Appl. No.: 338,312

[22] Filed: Dec. 19, 1994

[30] Foreign Application Priority Data

Dec. 17, 1993 [FR] France ............... 93 15258

[51] Int. Cl.$^6$ .......... C23C 14/30; C23C 14/00; B05D 5/12; B05D 3/02
[52] U.S. Cl. .......... 427/597; 427/596; 427/130; 427/380; 204/192.2; 204/192.26
[58] Field of Search .......... 427/596, 597, 427/130, 377, 380, 561; 204/192.2, 192.22, 192.26, 192.29

[56] References Cited

U.S. PATENT DOCUMENTS

| | | | |
|---|---|---|---|
| 3,759,745 | 9/1973 | Dixon et al. | 427/130 |
| 3,996,395 | 12/1976 | Chen et al. | 427/130 |
| 4,003,813 | 1/1977 | Hattori et al. | 204/192.2 |
| 4,297,395 | 10/1981 | Buxbaum et al. | 427/127 |
| 4,371,567 | 2/1983 | Chamard et al. | 427/130 |
| 4,477,319 | 10/1984 | Abe et al. | 427/130 |
| 4,717,584 | 1/1988 | Aoki et al. | 427/128 |
| 4,883,710 | 11/1989 | Machida | 427/131 |
| 4,911,957 | 3/1990 | Oishi et al. | 427/132 |
| 4,975,324 | 12/1990 | Torii et al. | 427/128 |
| 5,094,898 | 3/1992 | Morita et al. | 427/128 |
| 5,096,882 | 3/1992 | Kato et al. | 427/596 |
| 5,169,504 | 12/1992 | Bechevet et al. | 204/192.2 |
| 5,188,898 | 2/1993 | Tagawa et al. | 427/127 |
| 5,213,851 | 5/1993 | Snyder et al. | 427/128 |
| 5,320,881 | 6/1994 | Vittoria | 427/596 |
| 5,384,156 | 1/1995 | Belt et al. | 427/130 |
| 5,415,901 | 5/1995 | Tanaka et al. | 427/596 |
| 5,589,261 | 12/1996 | Tamari | 427/130 |

FOREIGN PATENT DOCUMENTS

| | | |
|---|---|---|
| 0428155 | 5/1991 | European Pat. Off. . |
| 0432038 | 6/1991 | European Pat. Off. . |
| 0480789 | 4/1992 | European Pat. Off. . |
| 2587990 | 4/1987 | France . |
| 2650115 | 1/1991 | France . |

*Primary Examiner*—Marianne Padgett
*Attorney, Agent, or Firm*—Nixon & Vanderhye P.C.

[57] ABSTRACT

Composite material for magnetooptic recording, comprising a thin layer deposited on a non-magnetic solid substrate. The said thin layer is a polycrystalline layer consisting of microcrystals having a structure of a vacant-site spinel ferrite, based on iron, cobalt and transition metals. By virtue of a particular process for producing the thin layers, enabling especially the size of the crystallites to be increased, it is possible to optimize the magnetic and magnetooptic properties and to obtain thin layers having, for example, a remanent Faraday rotation and a coercive field which are greater, respectively, than 1 degree per micron for the Faraday rotation and 1000 Oe for the coercive field.

10 Claims, No Drawings

COMPOSITE MATERIAL FOR MAGNETOOPTIC RECORDING ITS PREPARATION AND ITS USE

The subject of the invention is a composite material for magnetooptic recording, comprising a thin magnetic layer deposited on a solid substrate, its preparation and its use.

It is known that information in digital form is stored with the aid of binary information items, or bits, often symbolized by the numbers 0 and 1. Magnetic materials in the form of powders or of thin layers can be used to store such an information item. Currently, research is increasingly directed towards the production of magnetic recording media using the magnetooptic (MO) properties of ferromagnetic or ferrimagnetic substances, which enable, especially, very high density recordings to be made.

The information bits are written onto the magnetooptic recording media by magnetizing, positively or negatively (that is to say in one direction or in the opposite direction), small areas of the magnetic material constituting the so-called sensitive layer. The two possible directions of the magnetization constitute the two states (0 and 1) of the binary information. It is known that MO recording devices use the phenomenon of rotation of the plane of polarization of light by the magnetic materials, either by transmission (Faraday effect), or by reflection off a layer of reflective material after the light has passed through the sensitive layer, which is equivalent to a double Faraday effect, of interest since the Faraday rotation depends on the thickness of magnetized material through which the light passes.

In order to read the recorded information, the rotation of the plane of polarization of a laser beam having passed through the magnetized area is analysed. The direction of the rotation of the plane of polarization is a function of the sign of the remanent magnetization of the area through which the light has passed.

It is known that the application of a magnetic field external to a ferromagnetic or ferrimagnetic material makes it possible to represent the hysteresis cycle (curves representing the variations in the induced field as a function of the applied field) whose intersections with the ordinate axis correspond to the remanent magnetization and the intersections with the abscissa axis give the value of the coercive field. Similar hysteresis cycles are obtained by measuring the magnetooptic rotation (Faraday rotation) as a function of the applied field.

It is obvious that the sensitive layer of a MO device must, like all magnetic recording materials, possess a high coercive field in order to preserve the recorded information, preventing accidental erasures, and must accept high storage densities. It must also have a high remanent magnetooptic rotation in order to deliver a satisfactory intensity signal. Finally, in order to permit writing despite the existence of a high coercive field, it is necessary for the coercive field to be highly temperature dependent or for the Curie temperature to be quite low.

In fact, in order to avoid the use of magnetic heads which have to rub, or fly very closely over, the sensitive layer and in order to overcome the high coercive field (Hc), the writing is performed by a thermomagnetic process consisting in heating, with the aid of a laser beam, the area to be magnetized while at the same time remotely applying the magnetic field inducing the magnetization. The temperature rise generates a decrease in Hc below the value of the applied field, which then becomes sufficient to carry out the writing.

The materials for MO recording must furthermore have a low state of crystallization, that is to say a microcrystalline structure, of the sensitive layer in order not to generate too high a "media noise". If the size of the crystallites is too great, a significant "media noise" is observed, but the size of the crystallites must be sufficient to prevent the phenomena of superparamagnetism.

Furthermore, it is necessary for the magnetooptic materials to have very good stability of the MO properties over time, this implying, in particular, high chemical and crystallographic stability.

It is known that materials have the structure of vacant-site spinel ferrites have potentially useful magnetic properties in the field of magnetic recording; for example, see French Patents 2,180,575, 2,587,990 and 2,650,115. It is known that the spinel structure is, in particular, that of magnetite, $Fe_3O_4$, which is a mixed oxide ($FeO, Fe_2O_3$). The oxidation of magnetite leads to iron sesquioxide ($Fe_2O_3$) which preserves the crystalline structure of magnetite right up to the temperature of 460° C. The structure of such an iron sesquioxide is, in fact, a spinel structure with vacant sites since the oxidation of the ferrous ions present in the mixed oxide ($Fe_3O_4$) leads to expulsion of part of the iron ions from the sites which they would occupy in the $Fe_3O_4$ crystal, in order to maintain the balance of the electric charges in the lattice formed by the oxygen ions $O^{2-}$ which behaves as a rigid lattice. The crystal of the oxidized product then includes vacant sites or vacancies. The compounds called spinel ferrites are generally represented by the form $MFe_2O_4$, where M is a divalent metal, with reference to the formula of the $MgAl_2O_4$ spinel. Such a spinel is also called a "stoichiometric spinel". In order to represent the vacant-site spinel ferrites, keeping the number of metal atoms in the formula equal to 3, their formulae have to be written in the form:

$$M_xFe_{3-x}O_{4+t}$$

where M represents at least one metal capable of exhibiting multiple valence states and t representing a non-zero positive number. Another way of representing the vacant-site spinel ferrite is to write its formula in an equivalent form involving vacancies:

$$M_xFe_{3-x-y}\Box_yO_4$$

where the "$\Box$" symbol represents the vacancies.

It is obvious that, by introducing various substituents, constituted by metals having multiple valence states, into the spinel ferrites, it is possible to vary the number of vacancies; for example, see the patents mentioned hereinabove.

It would seem a priori useful to produce thin layers based on vacant-site spinel ferrites for MO recording. However, production of satisfactory thin layers with the aid of such materials raises significant technical difficulties. Thin-film deposition methods provide layers which do not necessarily have the spinel structure, and the crystallite uniformity and size are difficult to control. For example, sputtering gives crystallites which are too small.

By virtue of the design of a novel process for producing thin layers of vacant-site spinel ferrites, it has been discovered that, surprisingly, it is possible to obtain thin layers having satisfactory crystallite sizes and exhibiting useful MO properties markedly superior to those of powders of the same composition, thereby enabling such thin layers to be used as sensitive layers in MO recording devices. It has been discovered that the average size of the crystallites can be controlled more easily when the thin layer has a composition close to the "stoichiometric" ferrite (corresponding to t=0 in the formula given above). It has been discovered that, in fact, it is possible to control the size of the crystallites either by carrying out the deposition of the thin layer under reducing conditions, for example by sputtering in the presence of a certain proportion of hydrogen, or by carrying out, after the deposition, a treatment in the presence of a non-oxidizing (neutral or reducing) gas, as will be seen in more detail below. Of course, in both cases, an oxidation treatment should subsequently be carried out in order finally to obtain a vacant-site spinel ferrite structure in the thin layer.

It has also been discovered that the step of controlling the average size of the crystallites makes it possible to optimize the MO properties, which increase with the size of the crystallites, within a range of sizes which can be easily determined in each case by simple routine experiments. Thus it becomes possible, after restoring the magnetic properties by virtue of the formation of vacancies by an oxidation step, to select the compositions and/or treatments making it possible to obtain thin layers having the desired properties, in particular a remanent Faraday rotation at least equal to a predetermined threshold value (generally not less than 1 degree per micron) and a coercive field not less than 1000 Oe. In fact, it has been discovered that the sizes of the crystallites remain stable during the oxidation step. It has furthermore been discovered that the MO properties are further improved when the oxidation of the thin layer is carried out non-homogeneously. This can be carried out in various ways: either by incomplete oxidation of the thin layer (surface oxidation), limiting the oxidation time or the partial pressure of the oxidizing gas, or by complete oxidation of the thin layer followed by a partial surface reduction. In the first case, it is the areas adjacent to the face opposite that in contact with the substrate which are the most oxidized, and conversely in the second case.

The subject of the present invention is therefore a composite material for magnetooptic recording, comprising a thin layer deposited on a non-magnetic solid substrate, characterized in that the said thin layer is a polycrystalline layer consisting of microcrystals having a vacant-site spinel ferrite structure, in that the chemical composition of the said thin layer, excluding dopants possibly present, satisfies the crude formula (I):

$$Co^{2+}_{x}M_{y}M'_{z}Fe^{3+}_{3-x-y-z}O^{2+}_{} \qquad (I)$$

in which:

M represents a cation of at least one metal capable of having several degrees of oxidation, chosen from Mn, Mo, V, W, Cr, Cu, Fe and the rare earths.

M' represents a cation of at least one metal chosen from Zn, Ti and Al.

x, y, z and (4+t) are numbers representing the quantities of atoms Co, M, M' and O, respectively, x can vary from 0.4 to 2.2 and, in particular, from 0.5 to 2, y can vary from 0.05 to 0.5 and, in particular, from 0.1 to 0.2, z can vary from 0 to 0.5, it being understood that the sum (x+y+z) is not greater than 2.5 and, in particular, is not greater than 2, t is a non-zero positive number, in that the said thin layer is formed by crystallites whose mean size, measured by transmission electron microscopy or by X-ray diffraction, are in the range of approximately 10 to 30 nm, and in that the said thin layer has a remanent Faraday rotation and a coercive field which are greater, respectively, than a predetermined value, of at least 1 degree per micron for the Faraday rotation and of at least 1000 Oe, in particular at least 1500 Oe, for the coercive field.

The mean value of t, in the formula (I), depends in particular on the nature of the metals having multiple valence states and on the conditions of the oxidation treatment intended to create the vacancies in the spinel structure. The determination of t is of no practical interest, the main point being to improve the magnetic and MO properties by creating vacancies and possibly, furthermore, by inhomogeneous oxidation. It is believed that t is generally between approximately 0.05 and 0.5. In fact, the mention of t in the expression for the number of oxygen atoms in the crude formula (I) is of particular value as qualitative information, as it makes it possible to understand immediately that the crude formula (I) represents a vacant-site substituted spinel ferrite.

The microcrystals constituting the thin layer are called "crystallites". These are crystalline regions which diffract X-rays coherently. In other words, these are single crystals whose means sizes can be easily determined, especially by the methods indicated above.

The solid substrate on which the thin layer is deposited is, for example, a disc. It may be made of a transparent material, such as a glass in the case where the MO recording device operates with the light source on the substrate side. In this case, the composite material of the invention is intended furthermore to receive a layer of a reflective material, especially a metallic reflector, deposited on the face opposite to that in contact with the substrate of the magnetized thin layer, when it is desired to analyse the light on the same side of the substrate as the source in order to benefit from the double Faraday effect.

The solid substrate may also be a reflective substrate or may contain a reflecting layer deposited on a substrate, with the thin layer deposited on the reflecting layer, in the case where the light source and the read means lie, in the MO device used for reading, on the side opposite that of the substrate.

A preformated substrate may be used, or formatting may be carried out after the deposition of the sensitive layer.

In the materials of formula (I), the cobalt especially enables a highly temperature-dependent He to be obtained. The metals M', the presence of which is optional, have especially the property of lowering the Curie temperature. By virtue of the cobalt content and by virtue of the vacant-site spinel ferrite structure provided by the M elements in the formula (I), the magnetized thin layers of the invention are especially characterized by a large Faraday rotation. By virtue of the process which is at the origin of the invention, it is possible, in fact, to vary the Faraday rotation and/or Hc by controlling the sizes of the crystallites, by varying the number of vacancies and, possibly, by non-homogeneous oxidation of the thin layer. It is thus possible to obtain and select a thin layer having a Faraday rotation at least equal to a predetermined value and, possibly, to eliminate, by simple routine experiments, the compositions or treatments which would not be suitable.

Of course, the same applies for the coercive field.

In the formula (I), in accordance with the uses, the iron represented by the Fe symbol is trivalent iron, and when M represents iron, M then designates divalent iron. In fact, it is known to be possible to obtain mixed vacant-site spinel ferrites containing both divalent iron and trivalent iron; see, especially, the patents mentioned hereinabove.

The limitation concerning the sum (x+y+z), in the formula (I), is due to the fact that the composition must contain sufficient iron, especially so that the Curie temperature of the thin layer is not too low.

Among the rare earths which M may represent, mention will be made, in particular, of those having an ion radius close to 1 ångström ($10^{-10}$ m), and especially Dy, Gd, Tb, Sm, Nd, Er, Ho, Tm and Ce (IV).

In general, the vacant-site spinel ferrite compositions can be modified by dopants, which are not represented by the formula (I). The dopants are not substituents, that is to say they do not form part of the crystalline lattice. The use of a large number of dopants, for the purpose of modifying certain properties of the magnetic materials, has been described. The purpose of using dopants is, for example, to make it easier to control the crystallization or the development of a crystalline growth anisotropy. Generally, the dopants are present in a weight proportion not exceeding 1% by weight, with respect to the weight of vacant-site spinel ferrite of formula (I). The dopants are, for example, silicon, phosphorus, boron, alkaline or alkaline-earth metals, etc.

As indicated previously, the thin layer of the composite material of the invention advantageously has an oxidation gradient, this being manifested in the formula (I) by values of t which can be different for crystals located at different depths in the thin layer. Depending on the particular embodiments already mentioned hereinabove the number t characterizing the oxidation state of the crystals can be increased or decreased when the distance with respect to the substrate increases.

The subject of the invention is also a process for preparing a material as defined previously.

This process is characterized:
in that a thin layer of oxides of the metals Co, M, M' and Fe, in respective atomic proportions of x, y, z and (3−x−y−z), x, y and x being numbers as defined previously, as well as possible additives, is deposited on the said substrate according to known methods, in that the said thin layer is subjected to a heat treatment, in a reducing or neutral atmosphere, intended to increase the sizes of the crystallites to the desired sizes, in that the said thin layer is then subjected to a heat treatment in an oxidizing atmosphere until a thin layer having a vacant-site spinel ferrite structure is obtained, and in that the thin layers having the desired coercive field and remanent Faraday rotation are selected.

This last step amounts to discarding the thin-film compositions and treatments which are not satisfactory, that is to say those not making it possible to reach the Faraday-rotation and coercive-field values indicated above. In fact, although it is certain that the process of the invention is of general value and makes it possible in all cases, after possible development by simple routine experimentation, to improve the properties of the thin layers deposited on the substrate, it is obviously not possible to guarantee that all the compositions will give thin layers satisfying the conditions mentioned hereinabove concerning the Faraday rotation and the coercive field. However, it is also certain that the process of the invention makes it possible obtain, for the first time, thin layers of vacant-site substituted spinel ferrites having such Faraday-rotation and coercive-field values and that the possibility of obtaining, and even the possibility of the existence of, such thin layers could have been predicted.

The deposition of the thin layer on the substrate can be carried out, for example, by radio-frequency sputtering, by laser ablation, etc., starting with a target obtained in a conventional manner by sintering a mixture of metal-oxide powders and, possibly, additives (the latter being possibly in the form of oxides).

These deposition methods are well known and their principle will not be recalled here.

The optimum thickness of the thin layer, which most often lies between approximately 200 and 400 nm, can be determined in each case by experimentation beforehand, since the intensity of the magnetooptic signal also depends on the substrate and on the reflector, and furthermore varies in a periodic manner with the thickness of the sensitive layer.

In order to implement the treatment intended to increase the mean size of the crystallites, it is preferably advisable to operate under conditions enabling the thin layer to be converted into a layer having the structure and composition of a "stoichiometric" spinel, or a composition close to it. In fact, it has been discovered that it is in this state that the recrystallization of the thin layer may most easily be promoted.

The mean size of the crystallites can be controlled with the aid of a heat treatment at a temperature and for a time which are sufficient for the mean size of the crystallites itself to become sufficient to make it possible to obtain the desired magnetic and MO properties in the final product (thin layer having a vacant-site spinel structure). This heat treatment can be implemented in two ways:

when the deposited thin layer has a spinel structure spontaneously, the heat treatment can be carried out either in a reducing atmosphere or in a neutral (neither oxidizing nor reducing) atmosphere, since it has been observed that generally a heat treatment in a neutral atmosphere is then sufficient to maintain a composition close to stoichiometry, but it is also possible to operate, as the case may be, in a reducing atmosphere;

when the deposited thin layer does not have the spinel structure, the heat treatment is carried out in a reducing atmosphere in order to convert the composition of the thin layer into a composition corresponding to the stoichiometric spinel, or to a composition close to it, by virtue of which the thin layer then spontaneously organizes itself into a spinel structure and the recrystallization then takes place easily, as indicated hereinabove.

As neutral atmosphere, it is possible to use, for example, nitrogen and as the reducing atmosphere, mixtures of nitrogen and hydrogen. It is easy to determine experimentally the partial pressure of hydrogen which is suitable, sufficient to end up with a composition close to the stoichiometric spinel but less than that for which an oxide phase different from the spinel phase, or a metallic phase, would appear.

Here too, it is easy to determine the treatment conditions and durations which make it possible to obtain the optimum mean crystallite sizes which correspond to the optimum magnetic and magnetooptic properties desired for the final product (thin layer having a vacant-site spinel structure).

Preferably, the treatment intended to increase the size of the crystallites is carried out in the presence of water vapor which favours the rapid achievement of an equilibrium state.

The temperature of the treatment is generally between 150° and 500° C.

In general, the substrate must obviously be able to withstand the treatment temperatures.

In addition, when the deposition method used lends itself to it, it is possible to carry out the deposition in a reducing atmosphere, for example by sputtering in an argon atmosphere containing hydrogen in suitable proportions. In this case, the treatment intended to improve the mean sizes of the crystallites can be a thermal treatment in a neutral atmosphere (nitrogen, for example) and is carried out after the deposition of the thin layer.

The next step, making it possible to restore the vacant-site structure and therefore, in particular, the coercive field and the Faraday rotation, in a step of heat treatment in the presence of an oxidizing gas at a temperature sufficient to enable a vacant-site structure to be obtained. This operation is carried out, for example, at a temperature of 150° and 500° C., in particular 300° to 475° C. It has been discovered that this treatment does not measurably modify the size of the crystallites and does not therefore compromise the formation of a material having the desired properties.

The operation may also be carried out either in air or in a gas mixture containing oxygen, for example a mixture of oxygen and nitrogen.

The treatment time is that which, at the chosen treatment temperature, makes it possible to obtain the desired values for the Faraday rotation and the coercive field. Here too, this time can be determined by routine experimentation.

By varying the partial pressure of oxygen, the treatment temperature and/or the treatment time, it is possible to oxidize the thin layer non-homogeneously, as indicated hereinabove, this generally improving the magnetooptic properties.

The subject of the invention is also the use of the composite material as defined previously as a medium for magnetooptic recording. Such a material can be used for the implementation of MO recording according to the known methods. Of course, the composite material will undergo the usual treatments (possible deposition of a reflecting layer, deposition of a protective layer, etc.) depending on the type of MO device used. It is also possible to perform formatting, such as optical or magnetooptic formatting.

This use is implemented by using conventional magnetooptic recording and reading processes known per se. For the recording of a magnetooptic information item, the area of the sensitive layer to be magnetized is heated by a focused laser beam (spot area less than, for example, 1 µm²) of sufficiently high power, for example 10 mW, in order to lower the coercive field below the applied field or to heat above the Curie temperature so as to annul the coercive field temporarily, while applying a sufficiently high magnetic field in order to magnetize, in the desired direction, the heated area. For reading, a polarized laser beam of low power, for example 2 to 3 mW, is directed onto the zone of the sensitive layer to be read and the direction of rotation of the plane of polarization of the light, after passing through the sensitive layer (for example for the reflected beam), and therefore the sign of the magnetization of the area analysed, are determined by known methods.

The following examples illustrate the invention.

EXAMPLE 1

Thin Layers of Cobalt-Molybdenum Ferrite

For the production of thin layers of a cobalt and molybdenum mixed ferrite, iron, cobalt and molybdenum oxide mixtures were prepared by coprecipitation, and then oxidation of the corresponding hydroxides in a basic medium ($NH_4OH$). The suspension is kept at 70° C. for four days with sparging of air in order to enlarge the particles. After washing and drying, the powder obtained is heated at 800° C. in air in order to decrease the specific surface area (grogging).

After cooling, the powder is mixed with an organic binder (polyvinyl alcohol) in the following proportions (by weight): 80% of ferrite, 16% of water and 4% of polyvinyl alcohol.

The mixture is shaped in a die of 100 mm diameter with the aid of a hydraulic press. The applied load during the pressing is 50 MPa. Sintering is carried out at 970° C. for two hours in a nitrogen atmosphere, this making it possible to prevent the formation and sublimation of the $MoO_3$ oxide which forms during heat treatment in air.

After cooling at a rate of 60° C./h, a new sintering is carried out at 1200° C. for one hour under a load of 25 MPa, in order to flatten the ceramic.

Sputtering is carried out with an Alcatel CIT sputtering rig of the A450 type, used in radio-frequency mode. The substrates used to characterize the deposited thin layers were conventional glass slides. The substrates intended for the magnetooptic measurements and for the writing tests were optically isotropic glass slides of 1.2 mm in thickness. These substrates were degreased beforehand in a solution of nitric acid and then in a dichromatic-sulphuric acid mixture.

The sputtering deposition is carried out under conditions indicated hereinbelow. The substrates are subjected beforehand to ion etching using argon ions (0.5 Pa) for 20 minutes.

The deposition is carried out at a temperature not greater than 450° C. in order to prevent distortion of the glass substrates. The deposition conditions are as follows:

Argon plasma

Chamber pressure: 0.5 Pa

Target-substrate distance: 50 mm

R.F. power density: 4 W/cm²

Deposition rate is approximately 9.7 nm/min

Thickness of the deposition: 320 nm.

Next, a heat treatment is carried out under a reducing atmosphere, at 450° C. for 3 h in an atmosphere composed of 85% nitrogen, 9% water and 6% hydrogen.

Analysis shows that the thin layer essentially consists of a spinel phase corresponding to the stoichiometric spinel ferrite of formula:

$Mo_{0.1}Co_{0.9}Fe_3O_4$ having the following characteristics:

Faraday rotation: 0.5 degrees/µm

Mean size of the crystallites: 23 nm.

After heat treatment at 450° C. for 15 h, in air, a vacant-site spinel structure is obtained having the following characteristics:

Faraday rotation: 1.0 degree/µm

Hc: 2600 Oe.

Carrying out the sputtering in an argon atmosphere in the presence of 0.5% of oxygen, the thin layer obtained has essentially a spinel structure. However, in order to improve the magnetooptic properties, it is advisable, for example, to carry out subsequently the treatments of reduction and then of oxidation which are described hereinabove.

EXAMPLE 2

Thin Layer of Cobalt-Manganese Ferrite

A cobalt-manganese ferrite is prepared from hydroxides in a manner similar to that described in Example 1. A ferrite is obtained having a formula:

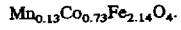
$Mn_{0.13}Co_{0.73}Fe_{2.14}O_4$.

The powder is firstly treated at 900° C. in air in order to decrease the specific surface area of the powder (grogging operation).

This powder is mixed with a binder as described in Example 1, and then compacted under a uniaxial load of 50 MPa. Sintering of the ceramic is carried out in air at 1200° C.

Sputtering is carried out in an argon atmosphere. The substrate is a glass of 1.2 mm in thickness. The conditions are the same as those described in Example 1. The thicknesses of deposited layers are between 250 and 350 nm.

Analysis of the as-deposited depositions, using X-ray diffraction, reveals the presence of a single spinel phase.

Chemical analysis (by atomic absorption and X-ray fluorescence) of the thin layers obtained shows that the as-deposited films do indeed have the composition of the starting mixed ferrite. The stoichiometry (oxidation state) was not studied.

The specimens obtained were subjected to various annealing treatments at a temperature of 450° C.: in air, under a nitrogen atmosphere and under a reducing atmosphere (89% nitrogen, 2% hydrogen and 9% water).

In each case, the spinel structure is preserved (this is not the case for the reducing treatment, at the temperature indicated, when the hydrogen content is greater than 2%).

The mean sizes of the crystallites, determined using the Scherrer method, are respectively 15, 18 and 26 mm for the mixtures annealed in air, under a nitrogen atmosphere and under a reducing atmosphere, respectively.

With the specimens studied previously, annealed and then oxidized under the same conditions, at 450° C. for 6 h in air, and therefore in the same oxidation state, it was possible to compare the magnetooptic properties as a function of the mean sizes of the crystallites, these remaining stable during the oxidation.

It was observed that the coercive field and the Faraday rotation increase when the mean size of the crystallites goes from approximately 15 to 25 nm.

In this way, the remanent Faraday rotation reaches 2.2 degrees/μm for crystallite sizes of 25 nm and a wavelength of 780 nm. The absorption coefficient of the layer is 20,000 cm$^{-1}$.

In the 400–500 nm wavelength range, the Faraday rotations are optimal and reach values close to 3.5 degrees/μm.

Furthermore, certain specimens treated under a reducing atmosphere were heated at temperatures of between 50° and 475° C. for 2 h, in air. Here too, it was found that the size of the crystallites was not altered during the oxidation treatment. After oxidation, an increase in the coercive field and in the Faraday rotation, these being measured at ambient temperature, is observed for the specimens treated between 200° and 450° C. and a decrease in the coercive field is observed for the specimens treated above approximately 450° C.

In a similar manner, thin layers of the following composition were prepared:

$Mn_{0.13}Co_{0.73}Zn_{0.30}Fe_{1.84}P_{4+t}$

EXAMPLE 3

Production of $Co_{0.73}Mn_{0.5}Fe_{1.75}O_{0+t}$ layers (a) Deposition by radio-frequency sputtering with the aid of an argon plasma (0.5 Pa chamber pressure) of a spinel ferrite layer 390 nm in thickness. The target is a ceramic of formula:

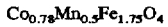

$Co_{0.78}Mn_{0.5}Fe_{1.75}O_4$ of spinel structure, the deposition power applied to the target is 4 W/cm², the sputtering time is 53 min and the substrate is glass 1.2 mm in thickness.

(b) The layer is treated under a reducing atmosphere (77% nitrogen, 11% H$_2$, 12% H$_2$) at 475° C. for 3 hours.

(c) The layer treated at (b) is finally oxidized at 475° C. for 10 hours. A ferrimagnetic spinel-type film is then obtained, of the indicated formula, possessing a coercive field of 3050 Oe and a remanent Faraday rotation at 780 nm of 0.46 degrees (that is 1.2 degrees/μm).

EXAMPLE 4

Recording-Reading Test

In a similar manner to that described in Example 3, thin layers of manganese-cobalt ferrite, containing cobalt, manganese and iron in the same proportions as those given in Example 3, were prepared. The substrates are sheets of isotropic glass having a thickness of 1.2 mm. The deposited thin layers have a thickness of 350 nm. Deposited on the thin layer, after the reduction and oxidation steps, is a metallic reflecting layer: aluminium or titanium.

By means of successive tests enabling the properties of the glass/ferrite/reflector assembly to be optimized, it has been determined that the best results for the Faraday rotation are obtained with a 32 nm layer of aluminium or a 60 nm layer of titanium.

The write/read set-up comprises a laser source which emits polarized monochromatic radiation (wavelength: 780 nm) in a plane perpendicular to the surface of the specimen. The laser source can operate in continuous-wave mode for the reading, and also in pulsed mode, by virtue of a frequency generator, for the writing. The applied magnetic field, perpendicular to the plane of the specimen, is obtained by virtue of two movable permanent magnets which are capable of applying opposed fields. The light passes through the substrate, and then the sensitive layer, and is reflected by the reflector. The signal is detected in the reflected beam, this being discriminated from the incident beam by a splitter cube. An analyser prism decomposes the reflected beam, after exiting the splitter cube, into vibrations polarized along two orthogonal directions. Two photodiodes each receive one of the vibrations and are connected to an amplifier. When the received light intensities are equal, the voltage U delivered by the amplifier is zero: this position corresponds to setting the "zero". A voltage U$_0$, (bit 0) and U$_1$ (bit 1), corresponds to each of the directions of the applied field. The read signal is the absolute value of the difference in these voltages: it is proportional to the remanent Faraday rotation of the sensitive layer.

The remanent Faraday rotation of the ferrite layer used for the tests was 0.7 degrees.

The applied magnetic field was 3300 Oe.

Light pulse time: 50 nanoseconds.

Size of the laser spot: 1 μm.

For the specimens subjected to a write power of 10 mW, the signal can range from 1 V to 3 V when the read power varies from 2 to 4 W. For a write power of 18 mW, the signal can range from 3 to 7 V when the read power varies from 2 to 4 W.

We claim:

1. A process for producing a composite material suitable for magnetooptic recording comprising:

a polycrystalline thin film deposited on a non-magnetic solid substrate, said thin film comprising microcrystals having sizes of about 10 to 30 nm having the formula (I)

$$Co_x^{+2}M_yM_z'Fe_{3-x-y-z}^{+3}O_{4+t}^{-2} \qquad (I)$$

wherein

M is a cation selected from the group consisting of Mn, Mo, V, W, Cr, Cu, Fe and rare earth elements;

M' is a cation selected from the group consisting of Zn, Ti and Al;

x is a number ranging from 0.4 to 2.2;

y is a number ranging from 0.05 to 0.5;

z is a number ranging from 0 to 0.5, such that the sum of (x+y+z) is less than 2.5; and t is a non-zero positive number;

said process comprising:

a) depositing oxides of Co, M, M' and Fe on said substrate, said oxides being in respective atomic proportions of x, y, z and (3−x−y−z) to obtain a layer comprising initial microcrystals;

b) heat treating said layer obtained in a) in a neutral or reducing atmosphere to increase the size of said initial microcrystals to about 10 to 30 nm;

c) heat treating said layer obtained in b) in an oxidizing atmosphere to form said thin film, such that a Faraday rotation of the product of step c) is greater than a Faraday rotation of the product of step b) and at least some of said film has a Faraday rotation of at least 1 degree per micron and a coercive field of at least 1000Oe; and d) selecting said thin film obtained in c) having the Faraday rotation of at least 1 degree per micron and the coercive field of at least 1000 Oe.

2. The process according to claim 1, wherein x is a number in the range of 0.5 to 2.

3. The process of claim 1, wherein the sum of (x+y+z) is less than 2.

4. The process according to claim 1, wherein said depositing is performed by sputtering or by laser ablation.

5. The process according to claim 1, wherein said heat treating of step b) is performed in the reducing atmosphere.

6. The process according to claim 1, wherein said heat treating of step b) is performed at a temperature in the range of about 150° to 500° C.

7. The process according to claim 5, wherein said reducing atmosphere comprises hydrogen.

8. The process according to claim 1, wherein said oxidizing atmosphere comprises oxygen.

9. The process according to claim 8, wherein said heat treating in the oxidizing atmosphere is carried out at a temperature ranging from 150° to 500° C.

10. In a process of magnetooptic recording wherein the improvement comprises recording on a magnetooptic recording material produced by the process of claim 1.

* * * * *